United States Patent [19]

Morris et al.

[11] Patent Number: 6,075,968
[45] Date of Patent: Jun. 13, 2000

[54] SYSTEM AND METHOD FOR EDUCATING LEARNING-DISABLED INDIVIDUALS

[75] Inventors: Lynda L. Morris, Durango, Colo.; Kayla F. Hefner, Midland, Tex.; Barry D. Johnson, New Town, N. Dak.

[73] Assignee: Apel Education Consultancy, LLC, Durango, Colo.

[21] Appl. No.: 08/834,958

[22] Filed: Apr. 7, 1997

[51] Int. Cl.[7] ................................. G09B 3/00
[52] U.S. Cl. .................. 434/350; 434/118; 434/362; 700/91; 706/927
[58] Field of Search .................... 434/118, 169, 434/307 R, 308, 322, 323, 350, 362, 365, 156; 706/927; 700/90, 91, 108; 455/3.1–5.1

[56] References Cited

U.S. PATENT DOCUMENTS

| | | | |
|---|---|---|---|
| 4,798,543 | 1/1989 | Spiece . | |
| 4,820,167 | 4/1989 | Nobles et al. . | |
| 4,968,257 | 11/1990 | Yalen . | |
| 5,002,491 | 3/1991 | Abrahamson et al. . | |
| 5,176,520 | 1/1993 | Hamilton | 434/350 |
| 5,263,869 | 11/1993 | Ziv-El | 434/323 X |
| 5,273,437 | 12/1993 | Caldwell et al. | 434/350 X |
| 5,302,132 | 4/1994 | Corder . | |
| 5,318,450 | 6/1994 | Carver | 455/3.1 X |
| 5,385,475 | 1/1995 | Sudman et al. | 434/307 R |
| 5,441,415 | 8/1995 | Lee . | |
| 5,597,312 | 1/1997 | Bloom et al. | 434/118 X |
| 5,727,950 | 3/1998 | Cook et al. | 434/350 |
| 5,730,602 | 3/1998 | Gierhart et al. | 434/362 X |
| 5,779,486 | 7/1998 | Ho et al. | 434/362 X |
| 5,823,788 | 10/1998 | Lemelson et al. | 434/350 |
| 5,829,983 | 11/1998 | Koyama et al. | 434/118 |
| 5,879,162 | 3/1999 | Bergman | 434/118 |

OTHER PUBLICATIONS

Artic Technologies Product Catalog, 1995 Spring, 12 pps.
"Transition Strategies for Persons with Learning Disabilities", Michaels, C.A. (ed) 1994, the Personal Computer, p. 252–269.

*Primary Examiner*—Joe H. Cheng
*Attorney, Agent, or Firm*—Felsman Bradley Vaden Gunter & Dillon, LLP; Frank S. Vaden III; Constance G. Rhebergen

[57] ABSTRACT

A system for educating learning disabled students includes a work station accessible by students and teachers for converting information between paper-written and computer character-recognized formats, whereby a teacher or a student can convert paper-written information such as assignments into a computer character-recognized format. The system further includes a plurality of student setups, each of which permit the exchange of computer character-recognized information with the work station. Each student setup presents computer character-recognized information to a student both audibly and visually in a synchronized manner to permit the student to acquire knowledge, understand assignments and produce work products in a computer character-recognized format that can be converted to a paper-written format at the work station for submission to the teacher. A student support network provides the student with supplemental information and guidance as needed to obtain a quality education.

12 Claims, 12 Drawing Sheets

SYSTEM AND METHOD FOR EDUCATING LEARNING-DISABLED INDIVIDUALS

BACKGROUND OF THE INVENTION

1. Field of the Invention The present invention relates to tools for educating learning disabled individuals, particularly those individuals with reading disabilities such as dyslexia.

2. The Related Art

In 1990, the United States Department of Education issued a document entitled "GOALS 2000." This document was essentially an education blueprint containing six broad objectives to be accomplished by public schools throughout the country before the turn of the century. As exemplified by the following two of the objectives, academic excellence was the predominant theme of GOALS 2000:

(1) every individual in the United States shall be able to read and write by the year 2000; and (2) the United States will be "first" in the world in the subjects of science and math by the year 2000.

Each state was instructed to generate an outline of corresponding state-level objectives and to detail their plan for actualizing the national goals. States have responded with their intentions to turn out students who are competent workers, contributing citizens, and who will be able to effectively compete in a global economy.

The education climate established by GOALS 2000 has resulted in a re-popularization of the "3 R's" and a wave of teachers enthusiastically returning to more traditional classroom objectives, all of which have been endorsed at the highest administrative and legislative levels. Student performance indicators and scores on standardized achievement tests have become an integral part of professional evaluations of classroom teachers and in many cases the benchmark upon which to base their raises and retention. In some states, school administrators receive personal financial incentives based upon similar data. These developments, while commendable and well-intended, have produced a motivation to shuffle students who are less capable performers (particularly test takers) onto other teachers, different schools, or into programs where their work will not be calculated into the overall picture of performance. Clearly, such motivation is rudimentary and endemic.

In terms of students, the amount of information and the pace with which it is presented in schools has never been greater; the competition to access further or higher educational opportunities begins earlier and has never been more fierce. Furthermore, jobs such as welding, plumbing, truck driving, etc., largely independent of language skills and once considered as viable options for poor readers and spellers, are often obtainable now only through rigorous training courses that rely on written manuals and paper and pencil tests.

Clearly, these are times of great emphasis on traditional academic achievement, and for students who cannot adequately cope with the fundamental skills of reading and writing necessary to acquire an education, the consequences could not be more far reaching than they are today. Learning disabled individuals, particularly those with reading impairments, are thus clearly disadvantaged in most educational environments. Assistive technology is currently available that can significantly improve learning disabled students' access to the instructional material they require. However, the technology is often ignored since this type of assistance is viewed as being too expensive and this group of individuals is usually considered as being the least needy in terms of the spectrum of needs exhibited throughout the special education population as a whole. As a result, the public school interventions for students with learning disabilities that have been generated over the last twenty years have been notoriously ineffective.

Strategies used to support students with learning disabilities or dyslexia can generally be sorted into two categories that reflect either a "remediation" or an "accommodation" approach toward the special educational needs of these students.

The remediation approach tends to target the student's difficulty with learning and is characterized by carefully selecting and precisely applying techniques to remediate areas that are considered deficient. All too often, however, the results of this approach is that students fall further and further behind the academic achievement level of their peers in the regular classroom. Research reveals that a learning disabled student beginning a remedial education program in the fourth grade who reads at a 2.0 grade level can be expected to improve at a rate of only 0.4 grades per year over the next three years. Margolis & Michaels, *Transition Strategies for Persons with Learning Disabilities*, p. 242 (1993). It can therefore be anticipated that after three years the student will enter the seventh grade at only a 3.2 grade level.

In contrast to the remedial approach, the accommodation approach focuses on student strengths and is based on the premise that students should work with material that is age and grade level appropriate but modified in ways that will foster their success. For example, students may have shortened assignments, fewer spelling words, more time to complete their work, or be provided with tape recorded textbooks. Teachers might base the students' grades on different standards of work or alternative kinds of student products. The accommodation approach is intended to protect self esteem, but when a weakness in learning is unaddressed or avoided, students may eventually find it impossible to tackle complex information or skills and lack exposure to experiences that are essential to their success beyond school doors.

One alternative attempt to teach learning disabled individuals, such as dyslexic children, to read and write is a "paired reading" technique developed by one of the present inventors, Lynda Morris, Ph.D. Dr. Morris's technique is somewhat of a merger of the remedial and accommodation approaches, and is based on the "Neurological Impress Method" developed by Heckelman in 1965. Here, whole words are read aloud to and with the individual while the individual uses his/her finger to follow along with the text that being vocalized. The reading material is selected in accordance with the interest and age of the individual rather than the individual's reading level. This technique is a one-on-one approach that encourages individuals to read at a pace that optimizes their comprehension, and to acquire information that is relevant to their current needs. However, this method is not suitable for classroom instruction since student/teacher ratios seldom permit such individualized attention.

The discovery that computer technology can accomplish the merger of the remediation and accommodation approaches with expeditious results forms the basis for the present invention. This invention addresses the urgent need for a better way to educate this group of students in public schools by:

(1) supporting regular classroom teachers since reading and writing becomes easier for learning disabled students;

(2) immediately freeing a regular teacher's time and energy for helping other students, creating and teaching the lesson, handling routine classroom activities, etc.; and (3) relieving regular teachers' stress of not being specially trained to help learning disabled students.

The present invention further responds to the needs of learning disabled students who are educated in these competitive times, because it:

(1) endorses the academic goals and objectives of "regular" education;

(2) enhances the likelihood of traditional academic achievement for students with learning disabilities;

(3) allows infinite repetition of learning material without exposure to criticism from peers, teachers, or others;

(4) eliminates the need to modify or reduce regular assignments for students with learning disabilities;

(5) encourages students to self monitor and expand the creative scope of their work; and (6) teaches the value of working to perfection by allowing easy corrections, modifications, and redrafts.

Financial limitations have probably never been more apparent in educational circles than they are today. When Public Law No. 940142 was passed twenty years ago, schools were not allowed to restrict programs for special needs students because of economics. However, the economic argument is steadily creeping into current acceptability. School administrators are being given wider discretion and autonomy over their special education funds and frugality, while necessary, is also being noted by government officials and the general public.

The acquisition of equipment and software for this invention is a one-time cost to schools since the system is infinitely adaptable to new textbooks, different teachers, and the written curriculum for any discipline including mathematics. The program setup and training course is intentionally organized to help schools offer the program with its current staff and the resourced assistance of fellow students, parent volunteers, and community assets. In some locations, large corporations have offered to donate used laptop computers for local programs. This invention responds to thriftiness in education because it:

(1) spreads the load of educating learning disabled students to a wider network of professionals and educational resources;

(2) doesn't require schools to provide extensive retraining for teachers, revisions to regular curriculums, the development of alternative curriculum, or expanding special needs services;

(3) doesn't require parents to pay for private tutoring;

(4) increases awareness of the impact of learning disabilities and provides a range of opportunities for all to respond positively to the problem;

(5) connects students to an ever widening circle of support.

There are fewer and fewer real world opportunities or alternatives for a person who is unable to adequately read and write. Perhaps no one realizes this as unmistakenly as the parents of learning disabled youngsters. When these parents deal with schools, they usually find themselves in a "Catch 22" situation, knowing that their child is being given "watered down" assignments, "hollow" grades and social promotions, or standing by and watching helplessly as their child fails if academic achievement is conceived and measured in a traditional sense. Parents who would normally recognize and emphasize the importance of getting a good education are becoming ever more suspicious and even hostile toward schools and teachers because of this impasse.

It is morally and ethically unacceptable for our society to continue to squander the tremendous human potential of learning disabled students. Statistics from prison and welfare populations reveal that only the most resilient learning disabled students are even surviving, much less flourishing, under the current educational system. This invention addresses both the immediate and the future needs of learning disabled individuals in our society by:

(1) reinstating parents as an integral support to their child's education;

(2) exposing learning disabled students to a complete curriculum so that they can become better educated workers;

(3) introducing students and parents to invaluable technological skills that can be useful in all aspects of modern life;

(4) reducing the likelihood of low self-esteem and poor job preparation which are closely linked to secondary behavioral manifestations like conduct disorders, delinquency, and crime and increased need for expensive education, psychological, medical, social, and judicial interventions.

It is therefore an object of the present invention to provide a system for educating individuals with learning disabilities that is self-remediating, and that requires little if any modification to the instructional materials or methods being used by the regular classroom teacher.

It is a further object to provide such a system that is compact and mobile so as to facilitate use in a classroom environment as well as at home and in a wider community in general.

It is a still further object to provide such a system that avoids drawing attention to the learning disabled individual in a classroom, and is fully inclusionary in its appearance and use.

It is also an object to provide a system that is responsive to individual needs so that it can be used to access any reading and writing activity and, as a result, make learning a way of life for students who have learning disabilities.

It is a further object of this invention to offer a wide range of supportive options so that the level of assistance needed is a decision left to the initiative of the individual student at every opportunity thus encouraging students to take responsibility for their own learning and level of achievement.

It is still further an object to efficiently and economically provide an educational experience for learning disabled students that centers on their individual needs and that will release their potential to contribute positively to our society.

SUMMARY OF THE INVENTION

The objects described above, as well as other objects and advantages are achieved by a system for educating learning disabled students that includes a work station accessible by students and teachers for converting information between paper-written and computer character-recognized formats, e.g., whereby a teacher or a student can convert paper-written information such as assignments into a computer character-recognized format. The system further includes a plurality of student setups, each of which permit the exchange of computer character-recognized information with the work station. More importantly, each student setup presents computer character-recognized information to a student both audibly and visually in a synchronized manner to permit the student to acquire knowledge, understand assignments and produce work products in a computer character-recognized format that can be converted to a paper-written format at the work station for submission to the teacher. A student support network provides the student with supplemental information and guidance as needed to obtain a quality education.

In a preferred embodiment, the work station includes a desktop computer having a keyboard, CPU, floppy disk drive, monitor, word processing software, an optical character recognition scanner and associated software, and a printer. The work station is further equipped in the preferred embodiment with a telephone modem and a CD-ROM drive.

In similar fashion, each student setup in the preferred embodiment includes a portable computer having a keyboard, CPU, floppy disk drive, monitor, audio output means, word processing software and auditory screen reading software. The student setup further includes a set of headphones connectable to the audio output means of the computer, a CD-ROM drive, and a telephone modem.

The student support network in the preferred embodiment includes online computer resources accessible through the work station via the computer and modem, teachers and other school support individuals, and parents and other family support individuals. The online computer resources include the INTERNET and the APEL Education Consultancy Support Network.

BRIEF DESCRIPTION OF THE DRAWINGS

In the drawings, wherein like reference characters are used throughout to describe like parts:

FIG. 7A-1 is a flowchart representation of a process for the student to bring instructional information into their realm of understanding;

FIG. 7A-2 is a flowchart representation of a process for the student to manage work products required by their teachers;

DETAILED DESCRIPTION OF THE PREFERRED EMBODIMENT

Figure 1:
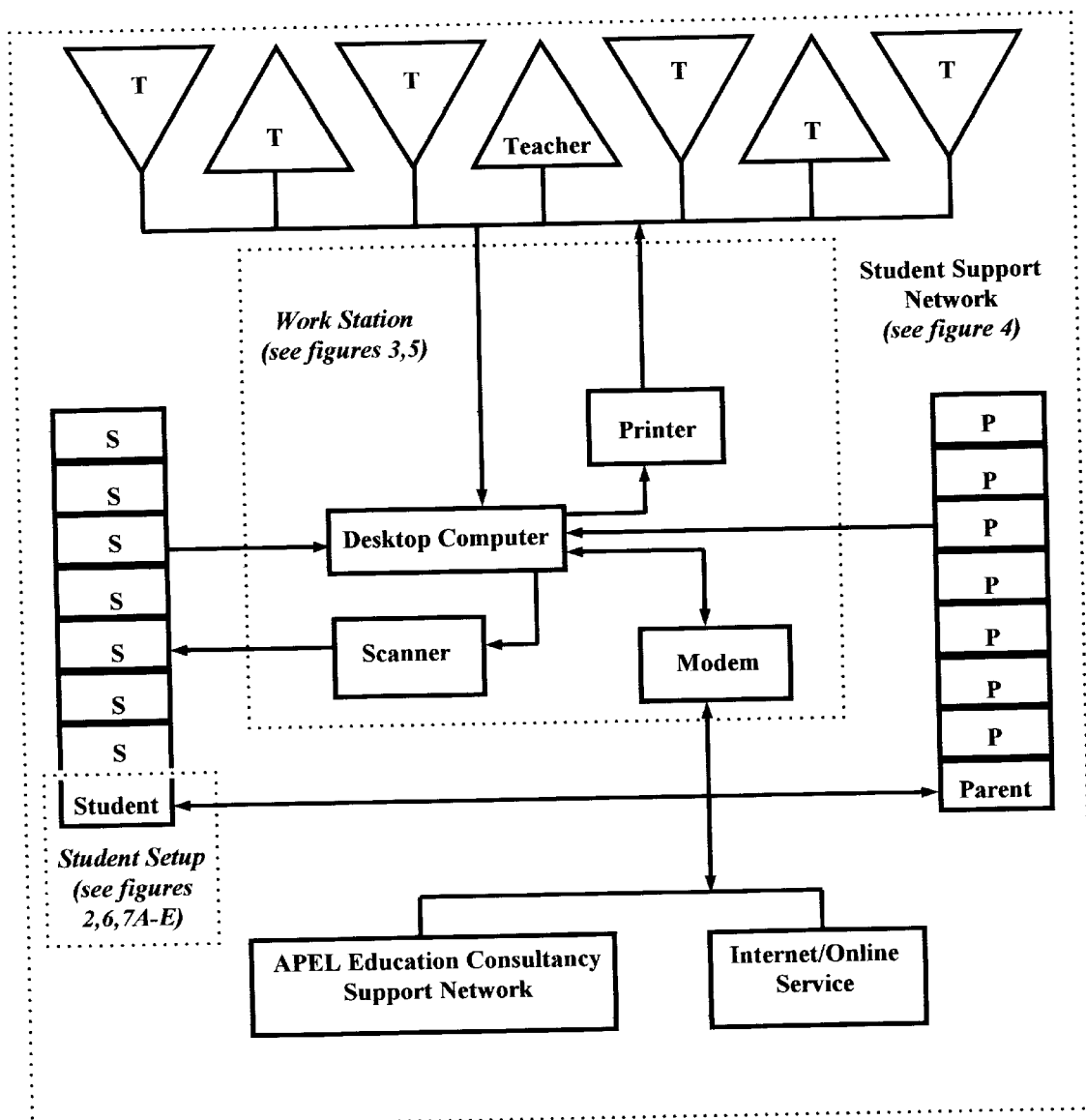
FIG. 1 is a diagrammatical view of the interrelationships between the three main sections that make up the present invention, the Student Setup, the Work Station, and the Student Support Network.

FIG. 1 illustrates an "Information Highway" that embodies the present invention, presently identified by the acronym "SLICE" (Special Learners Included through Computer Education). In a broad sense, the SLICE Program includes three main subsystems: Student Setup 10 represented by the box-shaped dotted lines at the lower left; Work Station 12 represented by the box-shaped dotted lines at the center; and Student Support Network 14 represented by the dotted lines that form a square-shaped boundary about the figure. The subsystems relate to one another in the sense illustrated by the lines connecting the subsystems in FIG. 1, as explained further below.

Figure 2:
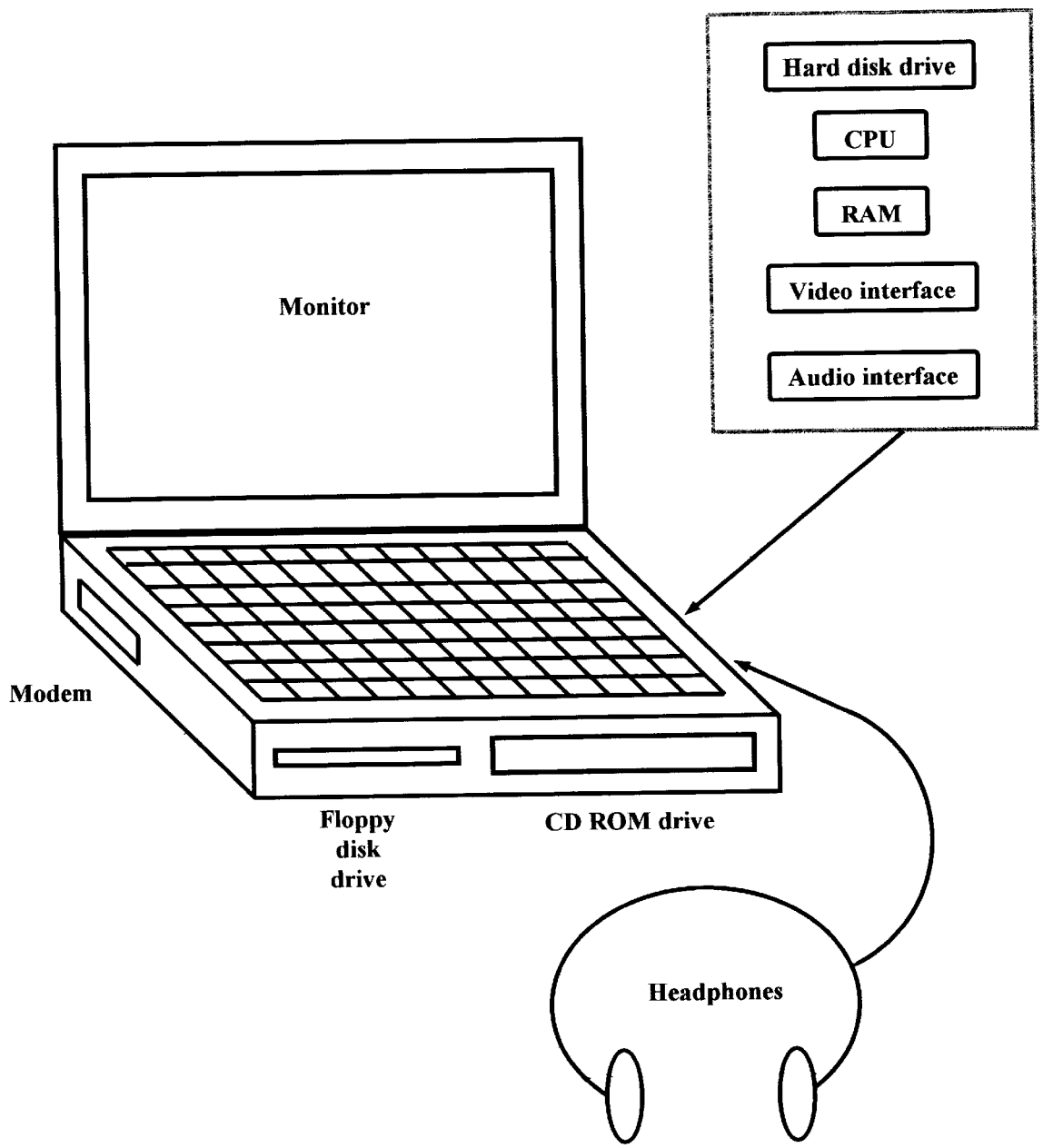
FIG. 2 is a perspective view of the Student Setup including a diagrammatical representation of the components within the student computer.

FIG. 2 shows Student Setup 10 in detail, which requires as a minimum an IBM compatible portable computer having a an 80486 processor, or a comparable Apple Macintosh. Student computer 16 should have at least 500 MB of "hard" disk storage space and 8 MB of RAM memory, as well as floppy disk drive 18, CD-ROM drive 20, soundcard (not shown), and modem (internal or external) 22. The soundcard is part of an audio output means that produces vocalized words through headphones 24 representative of the information displayed by monitor 26 (as described further below). It is preferred that the Student Setup computer be a "notebook" or "laptop" type to facilitate portability and to be fully inclusionary in a classroom environment, i.e., the computer is no bigger than a typical textbook. In fact, it is possible to "camouflage" the exterior of such a small computer so that it looks like a textbook.

The student's assignments and instructional information are converted from printed text to a floppy disk at the Work Station (described below) for inputting the assignments and information into student's computer 16. The assignments and information can then be stored on the computer hard drive for periodic retrieval as necessary. In fact, entire textbooks can be stored on the computer's hard disk.

Information loaded or stored in computer 16 can then be imported into word processing software, such as WORDPERFECT™ or WORD™ installed on the computer's hard disk storage. The word processing software is utilized for formatting, visually reproducing, and tracking the scanned text on video monitor 12B, in a manner that will be explained further below.

The computer further includes an auditory screen reading software package, such as the "ULTimate Reader," which digitizes and audibly reproduces or vocalizes the scanned text back to the user. The screen reading software coordinates and synchronizes the visual text reproduced through the word processing software with the vocalized "reading" produced through the screen reading software, or screen reader. The reader software permits the audible "reading" of the scanned text displayed by the word processor to be performed automatically, and enables the user to see the text being tracked by a lighted cursor on video monitor 26 while hearing the text through headphones 24 connected to the speech synthesizer via computer 16.

The reader software permits the user to start and stop the reading, as well as vary the speed at which the text is read. The user may also search through the scanned text for certain passages or words as needed.

In this manner, learning disabled individuals are provided with full access to printed information being used for instructional purposes in the classroom or other environments via the "paired reading" technique. The equipment is completely portable, and requires a minimum of desktop space so that the individual need not draw attention to himself or herself in a learning atmosphere. Furthermore, this method represents the use of assistive technology as required by the "Technology-Related Assistance for Individuals with Disabilities Act of 1988."

The CD-ROM drive and modem, which are both preferably mounted internally within the student's computer, permit the student to access virtually infinite information sources in a manner that will be further described below.

Figure 3:
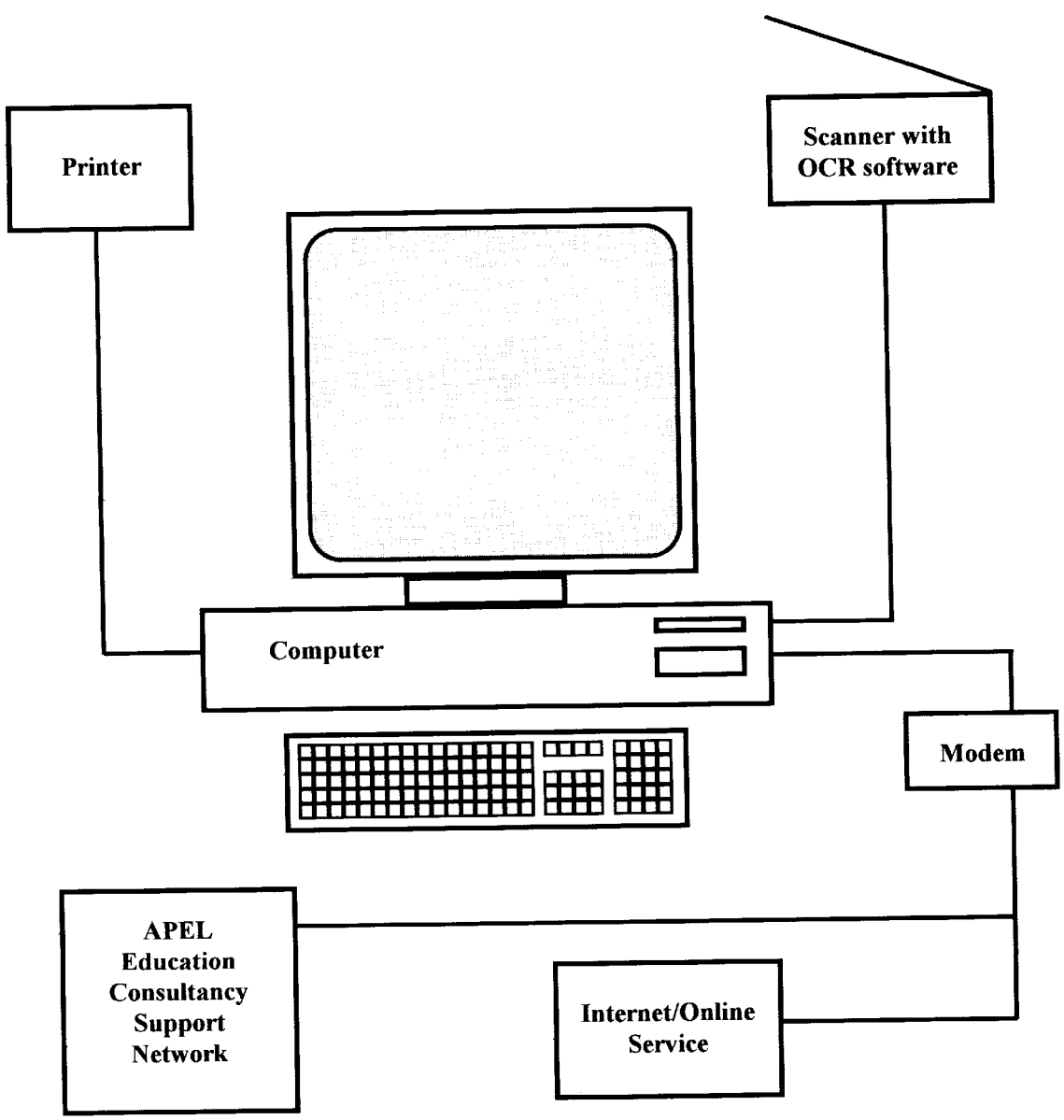
FIG. 3 is a diagrammatical representation of the Work Station.

FIG. 3 shows Work Station 12 of the present invention in detail. The Work Station is the central point of converting assignments, instructional materials, work products, etc., between printed and electronic, i.e., computer character-recognized formats. Thus, written information from textbooks, as well as worksheets, tests and other handouts provided by a student's teacher are converted at the Work Station and output to a floppy disk. The written information is placed upon the floppy disk using input means such as a commercially available optical character recognition (OCR) scanner 32 in cooperation with commercially available OCR software. When the student completes a lesson on computer 16, the work product is converted back from computer recognizable characters into printed format by exporting the product to a floppy disk, taking the disk to the Work Station, and printing the product at primer 34 for submission to the student's teacher.

In addition, the Work Station provides "online" access to a broad support network that includes the INTERNET, the APEL Education Consultancy Support Network, and other sources that the student may not have access to from his/her home, via telephone modem 36.

Figure 4:
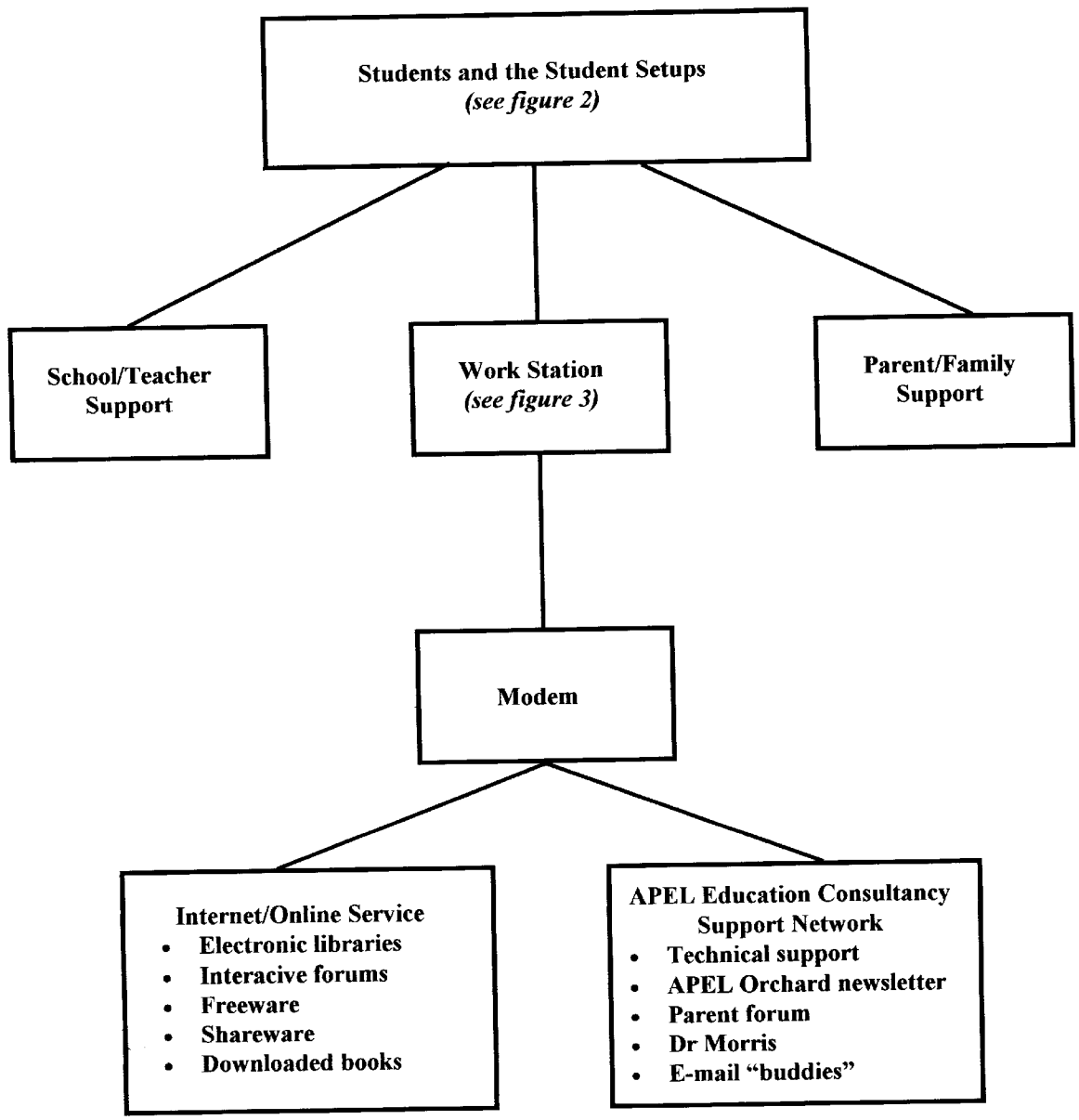
FIG. 4 is a diagrammatical representation of the Student Support Network.

FIG. 4 illustrates the multiple sources of student support that make up Student Support Network 14. Students are thereby encouraged to communicate with their teacher(s), parents and fellow students, as well as connect with online services such as the INTERNET and the APEL Education Consultancy Support Network for the support they require to assist their learning. Of course, teacher and parent support is more immediate, direct, and personal in nature, but the online services can provide the student with additional information, technological guidance and valuable advice based on common experiences. Thus, the Student Support Network functions primarily to provide students with a wide range of information and types of support that have previously been unavailable or inaccessible to them.

The APEL Network provides technological support specific to the student Information Highway via e-mail, by way of modem 36 at the Work Station. An e-mail address of individuals using the program is also available so that students and parents can contact each other directly to ask for advice or obtain support. Interactive forums dealing with selected topics are held periodically and are announced in an APEL newsletter which is mailed to each family on a regular basis.

Figure 5:
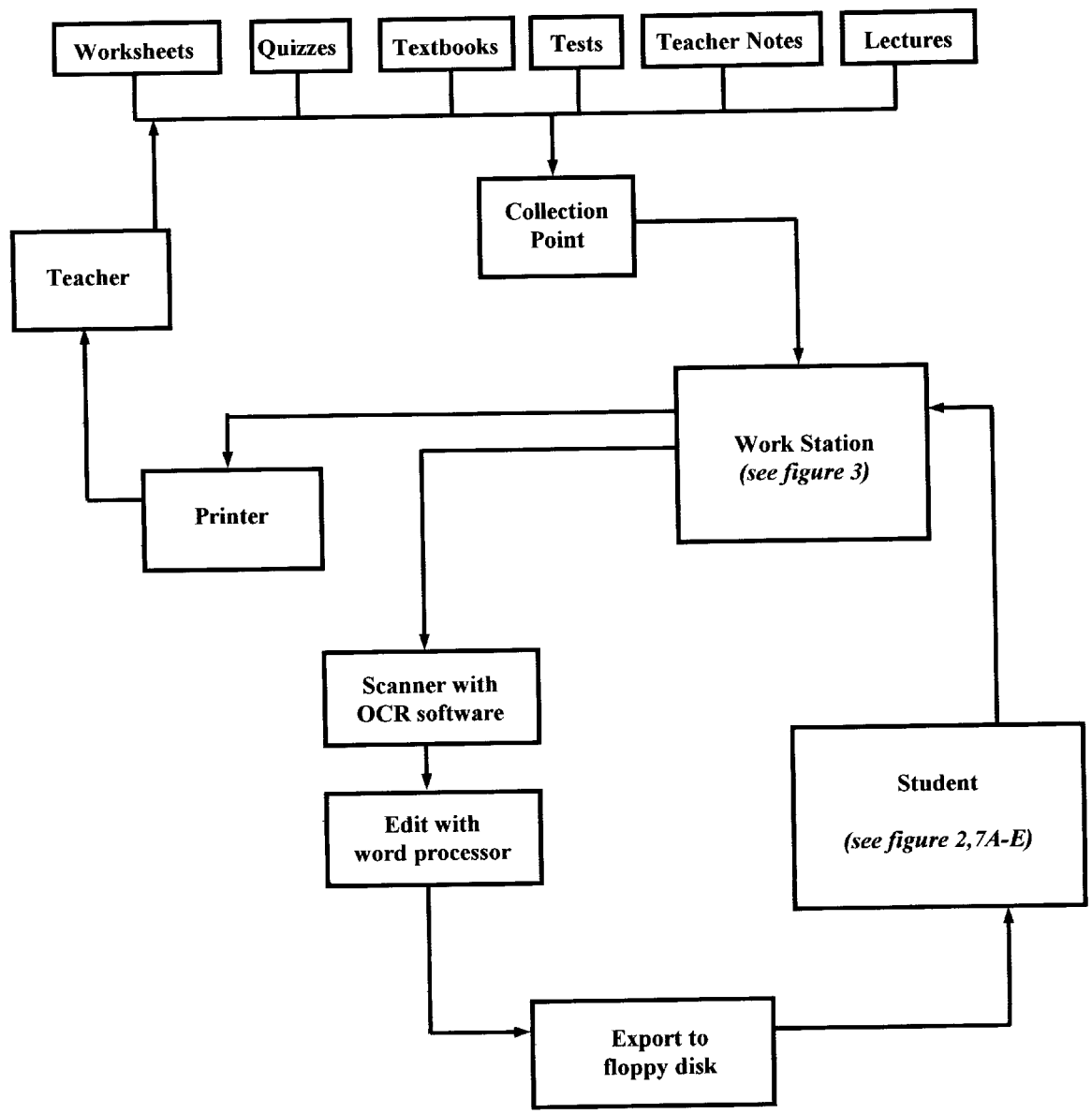
FIG. 5 is a diagrammatical representation of a process for converting information from printed media to electronic form at the Work Station.

FIG. 5 displays the process for collecting assignments and other information, including worksheets, quizzes, textbooks, tests, teacher notes, and lectures at central collection point 40 so that the information can be converted from paper to an electronic format. The conversion process begins with the scanning of the printed material so that the scanned text can be recognized by the OCR software. Once the text has been scanned, it is likely that at least minor editing will be needed to correct character recognition errors caused by the deficiencies of either the software or the quality of the printed text. It is therefore essential that the text input to the scanner is in a clean, typed format for optimum results.

After the information has been sufficiently edited or checked to verify its accuracy, it is exported from Work Station computer 30 to a floppy disk for the student's use.

At that point, the student can input the information into his/her own computer and begin the learning process, as described further below. When the student has completed the project or lesson, a work product can be produced on the floppy disk through student computer 16. The student then returns the disk to Work Station 12 for conversion back to a paper product, which is submitted to the teacher for evaluation.

Figure 6:
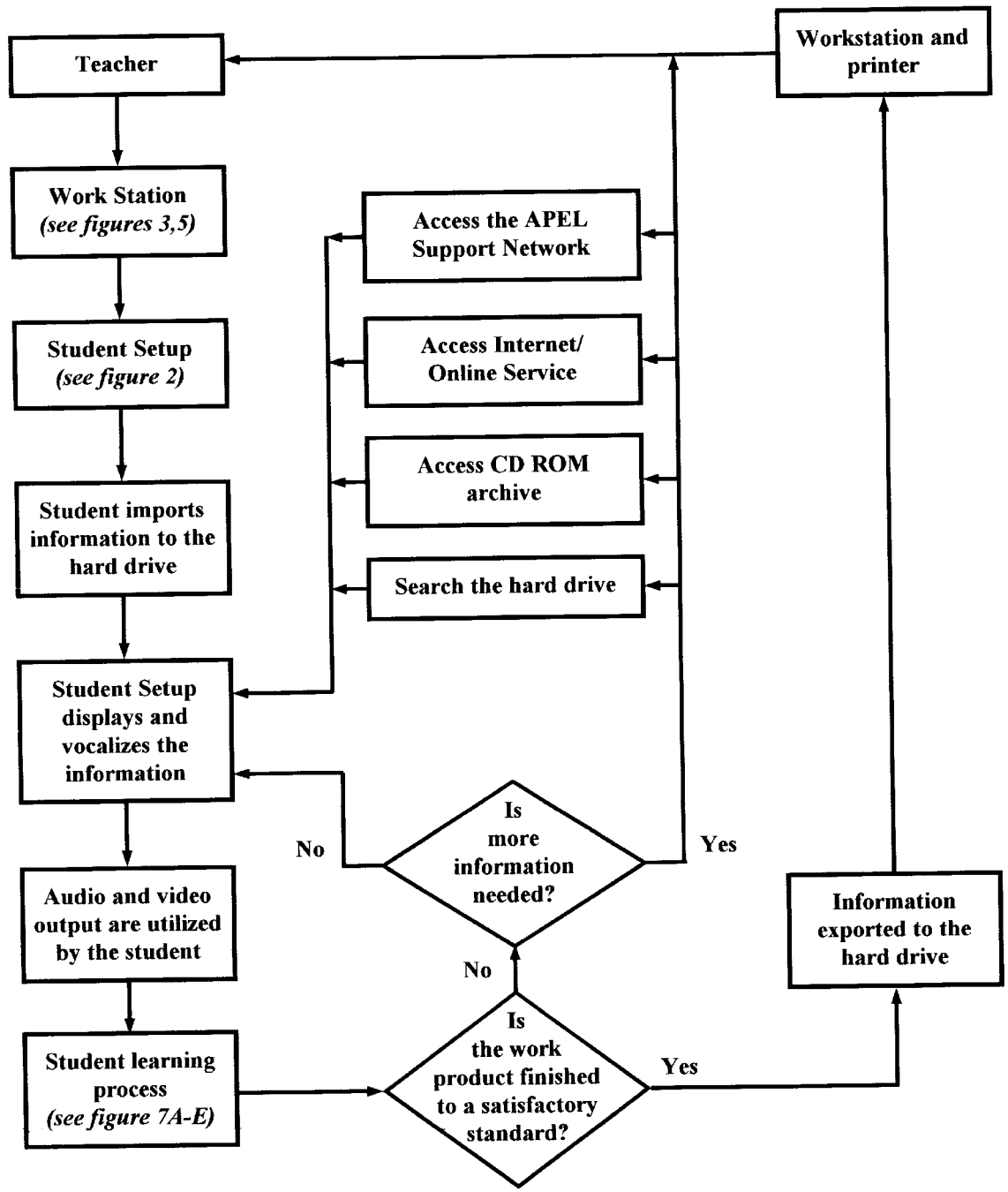
FIG. 6 is a diagrammatical representation of a pathway enabling a learning disabled student to access, use and produce information required to secure an education.

FIG. 6 displays a diagrammatical pathway for successful interaction between the student and written language. Thus, FIG. 6 broadly outlines the process through which the student accesses and produces the information required to secure a quality education. More particularly, FIGS. 6 and 7A–7E highlight the plurality of choices that the student continually makes regarding the use of the SLICE Program's Information Highway to accomplish their personal learning goals.

Typically, the process begins with the delivery of instructional documents to the Work Station by the teacher, as shown at the upper left corner of FIG. 6. At the Work Station, the conversion takes place (as discussed previously) and the information is exported via floppy disk to the Student Setup 10. The student then imports the information to the hard disk on his/her computer for future reference, and uses the screen reading and word processing software to vocalize the information as it is displayed on the computer monitor 26. In their manner, the student simultaneously sees and hears the information presented for study and/or production of a product. At this point, the student engages in the learning process (described below with reference to FIGS. 7A–7E).

If the student's output product, at the completion of the learning process, is satisfactory to the student, the product is exported to the floppy disk for printing at the Work Station and presenting to the teacher.

If the product does not meet the student's satisfaction, the student can obtain assistance (if necessary) by accessing supplemental information through the hard drive and CD-ROM drive in computer 16, various other multi-media applications, or online services such as the INTERNET and the APEL Support Network by way of modem 22 in the student's computer. Alternatively, such information may be accessed at the Work Station. The new information can then be vocalized through the student's computer and monitored through the computer monitor and headphones simultaneously to determine if the information can be used to improve the quality of the student's work.

Figures 1, 7A:
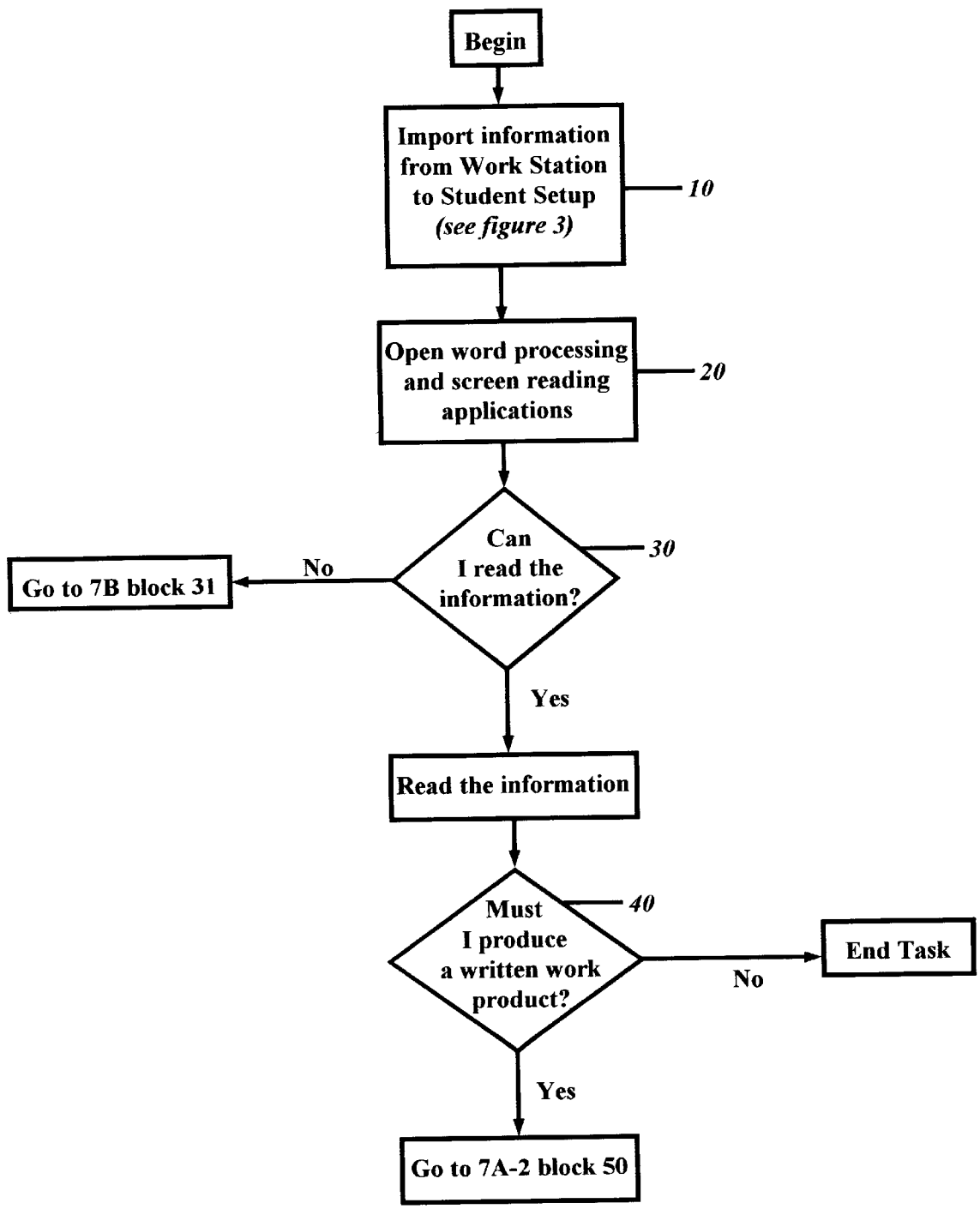
Figures 2, 7A:
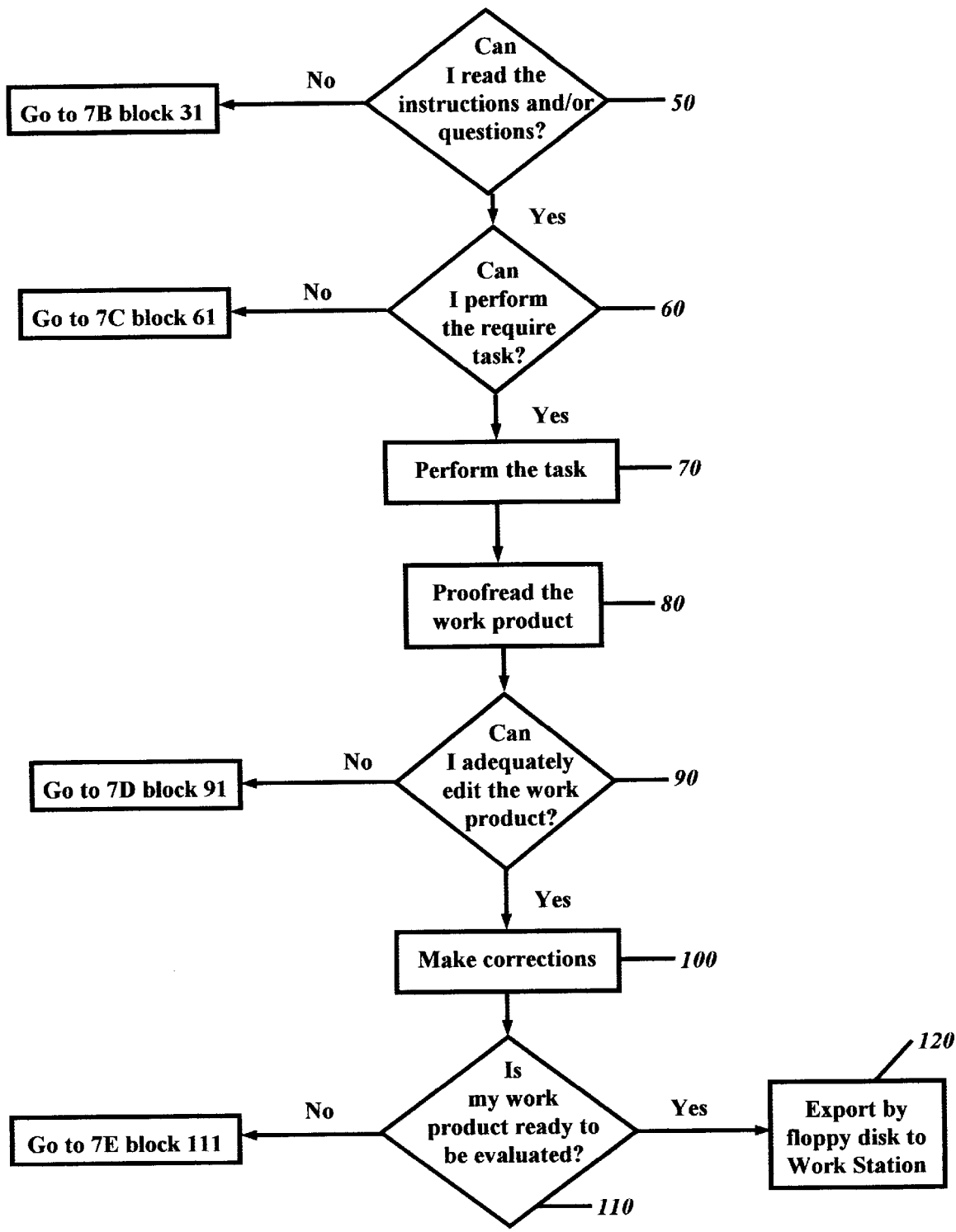

FIG. 7A-1 illustrates a flow chart modeling the process through which students bring educational information into their realm of understanding. As indicated previously, the learning process begins by importing information from the Work Station to the Student Setup in block 10. Once the information is within the student's computer, the student opens the word-processing application on the computer and determines if he/she is able to read the information as presented visually on the computer monitor (blocks 20, 30). If the information cannot be read, the student additionally opens the auditory screen reading software to obtain assistance in "reading" the information through the paired reading technique, as described further below with regard to FIG. 7B at block 31. Once the information has been read, the student can determine if a written work product is required as shown at block 40. If no product is required, the learning session is concluded after the information has been read. If, however, a written product must be produced, the student continues on to the output process displayed in FIG. 7A-2 at block 50.

FIG. 7A-2 thus displays how the student manages written work products required by the teacher. If the student cannot sufficiently understand the visual instructions or questions from the assignment, the student proceeds to open the screen reader (described below at FIG. 7B, block 31) for auditory assistance. If the student does understand the assignment, a decision must be made as to whether the required task can be performed directly on paper (block 60). If the task cannot be performed on paper (block 60), the student proceeds to FIG. 7C, block 61 to produce a written product, as described below.

If the task can be performed on paper, the student completes it and proceeds to proofread the product, as represented by blocks 70 and 80. At this point, block 90, the student must decide if the product can be edited on paper, assuming edits are needed. If the student cannot adequately edit the product on his/her own, the student proceeds to the process shown in FIG. 7D, block 91 to proofread and correct the work.

If the student can independently make the needed corrections or edits, he/she does so, and finally reviews the work to determine if it is ready to submit to the teacher for evaluation (blocks 100, 110). If the work is deemed to be incomplete, the student can then access additional information sources as seen in FIG. 7E, (block 111). Otherwise, the completed work is exported to a floppy disk and taken to the Work Station for printing the finished product.

Figure 7B:
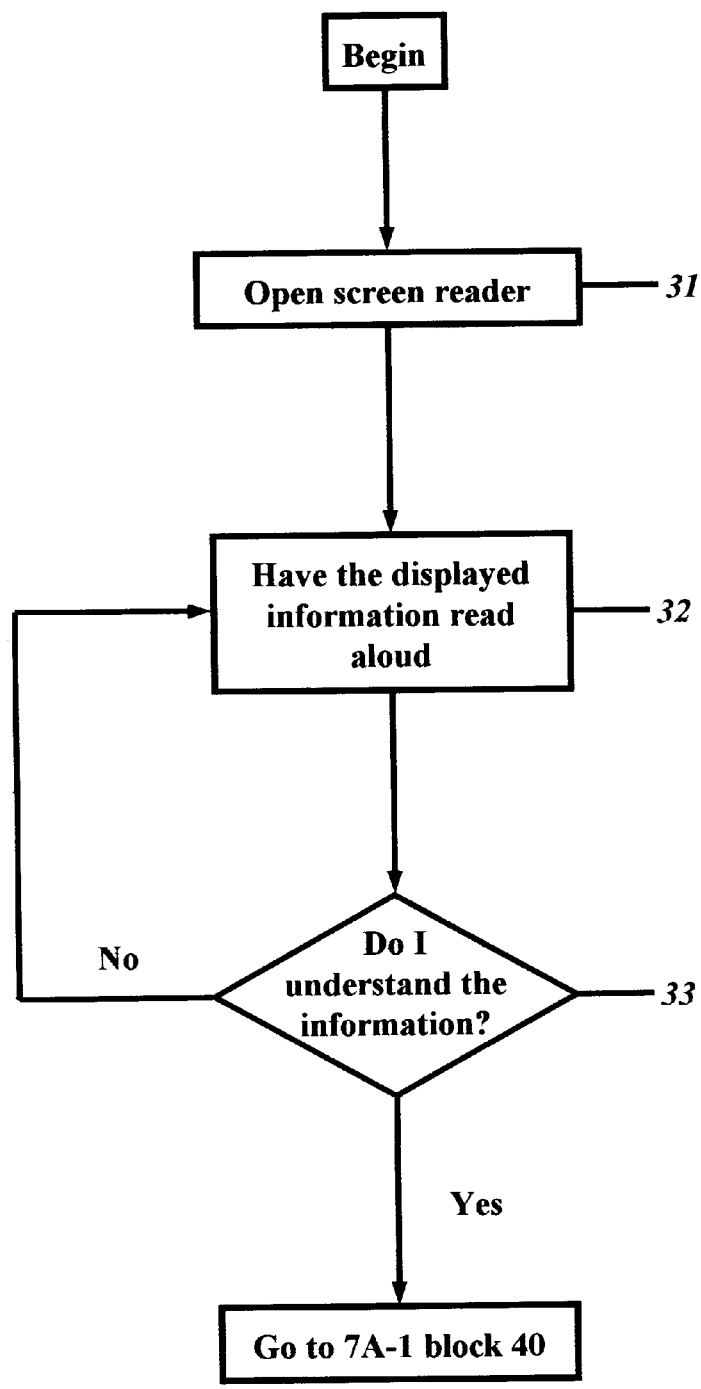
FIG. 7B is a flowchart representation of a process for proceeding if the student cannot read their assignments independently.

As indicated above, if during the learning process, the student determines that he/she cannot independently read the information displayed on Student Setup computer 16, the student proceeds to open the auditory screen reader as shown in the flowchart of FIG. 7B at block 31. After the information has been vocalized to the student, the student decides whether the information has been sufficiently comprehended (block 32). If it has, the student proceeds to determine whether or not a written work product is required, as described above with regard to FIG. 7A-1, block 40 for the learning process generally. If, however, the information was not understood as vocalized by the screen reader, the student can have the vocalization repeated (return to block 32) until it is understood.

Figure 7C:
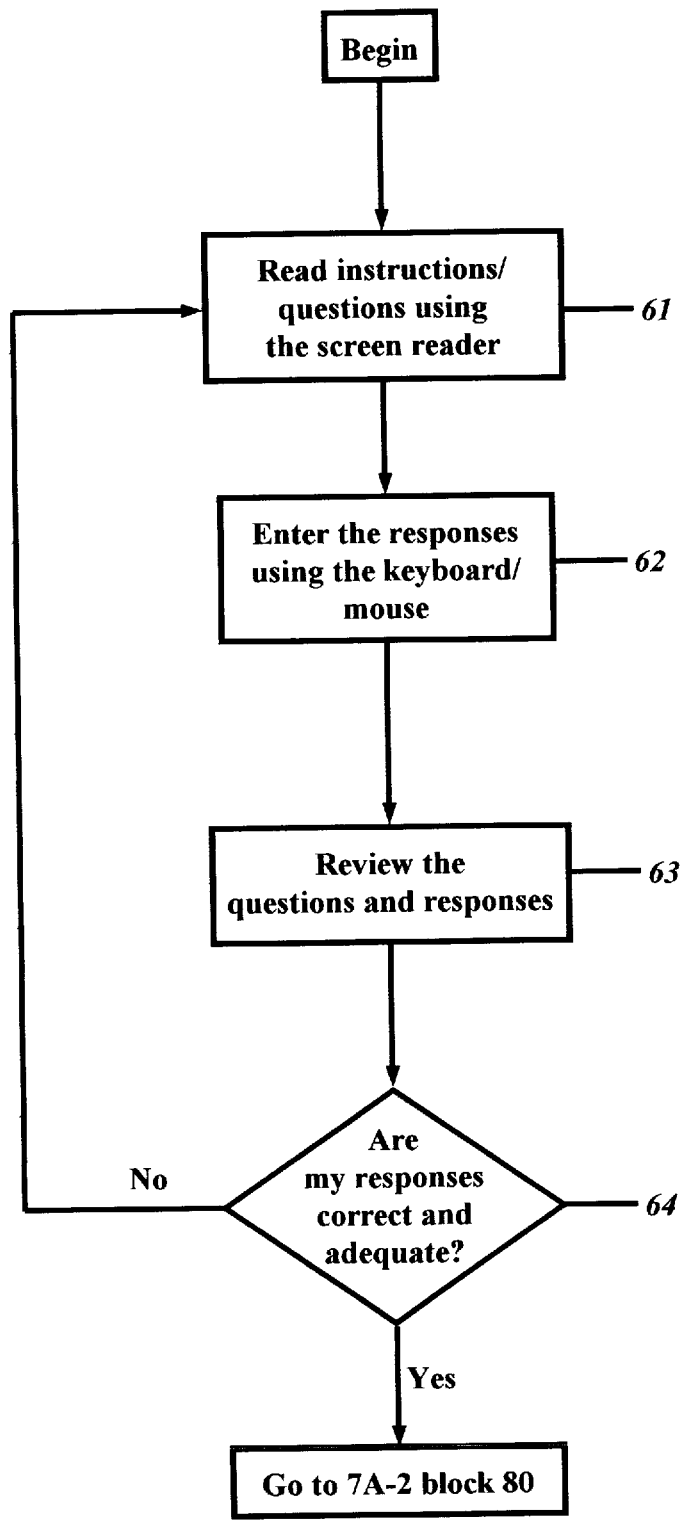
FIG. 7C is a flowchart representation of a process for using the screen reader when the student is unable to produce a written work product independently.

If during the learning process, a student determines that he/she is unable t produce an assigned or desired work product, the student again seeks assistance with the auditory screen reader, as displayed in the flowchart of FIG. 7C. Thus, the screen reader can be used to audibly monitor the instructions or questions, and the input typed by the student at Student Setup computer 16, as shown at blocks 61–62. Once the student input is completed, the student reviews his/her work product for accuracy and adequacy, as seen at blocks 63–64. If either the accuracy or adequacy of the product is not satisfactory, the student can repeat any of the steps displayed in the figure, as by returning to block 61. If the work product is satisfactory at this stage, the student proceeds to the proofreading process, as described above in reference to FIG. 7A-2 at block 80.

Figure 7D:
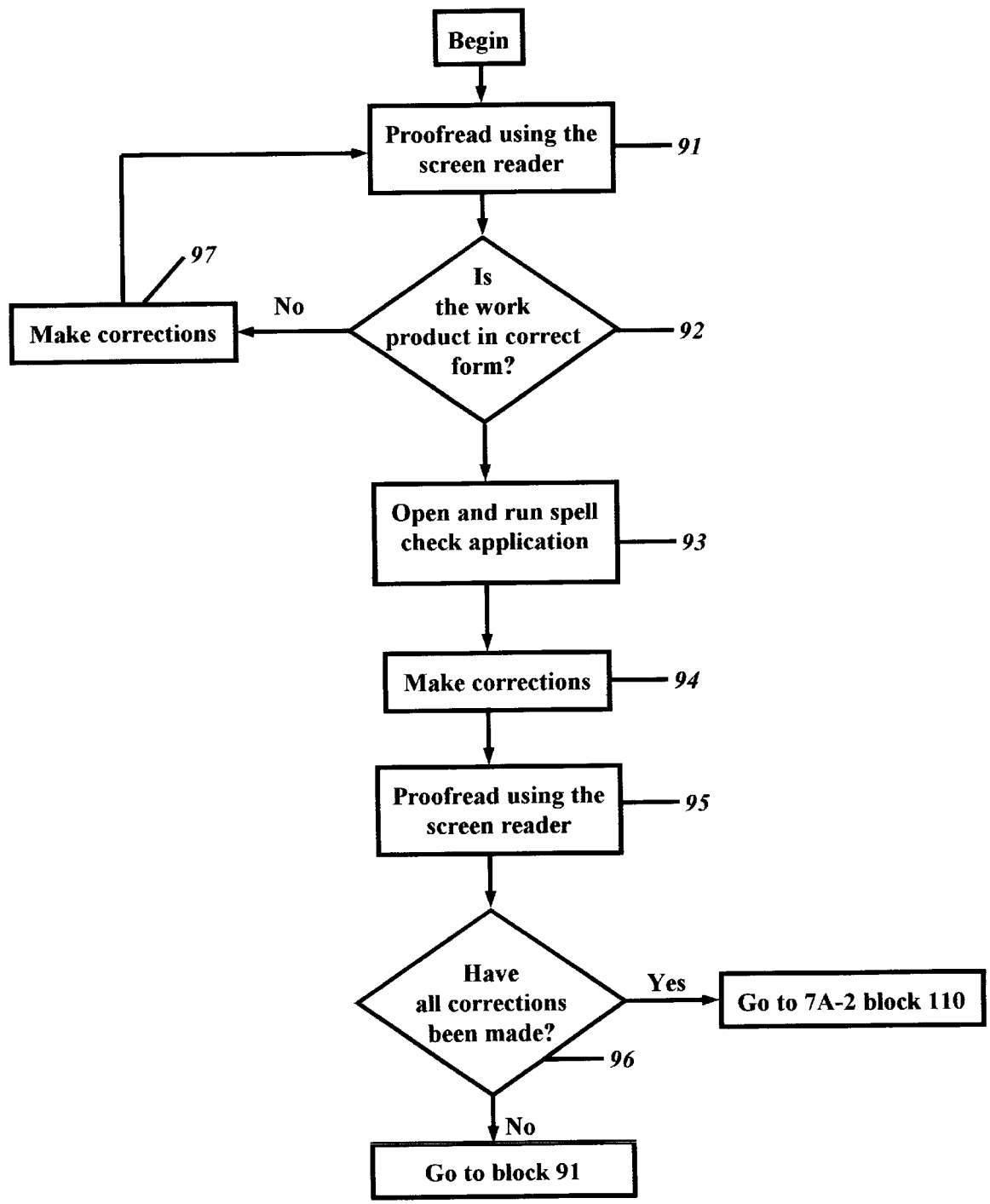
FIG. 7D is a flowchart representation of a process for using the screen reader to edit work products when the student is unable to adequately edit the product independently.
Figure 7E:
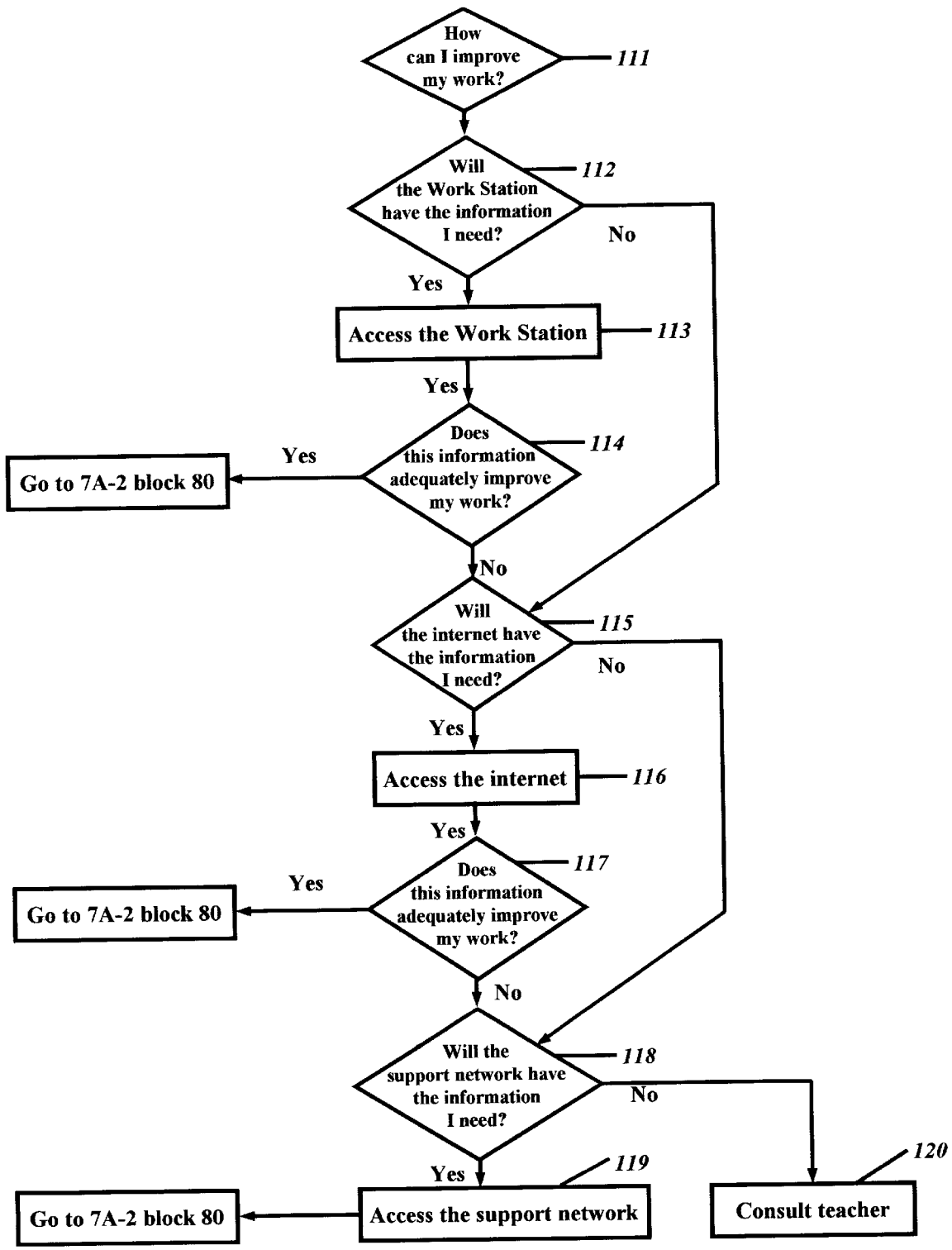
FIG. 7E is a flowchart representation of a process for accessing additional resources if the student determines that the quality of a work product does not meet the desired standard.

FIG. 7D displays a flowchart exhibiting the process for editing a work product if the student is unable to do so on his/her own, i.e., on paper. First, the student uses the auditory screen reader to vocalize the product for "proofreading," as shown at block 91. Then the student must decide, at block 92, if any edits to the product must be made. If edits are required, the student makes the desired corrections (following block 97) using the keyboard and the screen reader. If no editing is believed to be necessary, the student opens and runs a spellchecking feature in the word processor and makes needed corrections, as displayed at blocks 93 and 94.

Once the corrections have been made, the student can repeat the proofreading using the screen reader for verification purposes (block 95). Depending on the outcome of such further proofreading (block 96), the student can either reiterate proofreading and correction by repeating the process from block 91 or proceed to a determination of whether the product is ready for printing and submission to the teacher, as described above with regard to FIG. 7A-2 at block 110.

FIG. 7E illustrates a process block for improving the quality of a student's work product if the student feels it is lacking in regards to quantity or quality, and could benefit from additional data or support, as shown at block 111. The figure thus displays an array of sources among Student Support Network 14. The student first accesses the Work Station (blocks 112–114) to determine whether the resources contained in its hard disk storage will be helpful to clarify, add detail or enhance the depth of his/her work product. The student may conclude that the information from the Work Station will not be appropriate, as seen at blocks 112–114, and consider accessing one of the many available online resources. The INTERNET, for example (block 115), offers almost limitless data sources that are accessible through the modem at the Work Station or at student computer 16. Searches may be performed on the INTERNET (block 116) using commercially available access software such as NETSCAPE in association with "search engines" such as YAHOO to access libraries, FTP download sites, university Gopher sites, and more. Alternatively the student may wish to access the APEL Support Network, shown at blocks 118 and 119.

Whatever the source, once relevant information is identified, it can be downloaded to the Work Station computer in a conventional manner to supplement the student's work product. After reviewing the supplemented work, the student can decide if the work still needs improvement. If not, the student can proceed with the assigned task as indicated in FIG. 7A-2, block 70.

If the work is deemed to require improvement, the student should consider whether Support Network is likely to have more useful information (also blocks 118–119). If the student's conclusion is no, he/she should contact the teacher who will determine where the learning process has stumbled, at block 120. Preferably, the student will have faith in the Support Network, and will use it (block 119) to contact fellow students, other APEL "buddies'," parents and/or APEL staff that are part of the extended Support Network via e-mail or otherwise. Once the needed information has been obtained, the student is able to decide if the product is completed and ready to turn in for evaluation (FIG. 7A-2, block 110).

A pilot program for the present invention has revealed that teachers are very receptive and supportive of the program. Training is provided through a typical "Teacher Inservice" day, and consists of a 3–5 hour session that precedes the initiation of the SLICE Program in a school. It is mandatory that every teacher who provides instruction to student participants should attend.

The teacher training explores the phenomenon of language related learning disabilities, and illustrates the typical problems with examples of student work and teacher experiences. The learning theory and research studies that underpin the computerized instructional strategy for these students is supported by written documentation provided to the teachers. The philosophy of engaging parents in their child's education and including students in their regular classes is also examined in this information and through a question and answer format.

Teachers are given a general overview of the technological system, with particular emphasis on the Work Station, the overall Information Highway, and techniques to facilitate the managing of their handouts, tests, and assignments. The teachers are given the opportunity to scan and edit instructional materials at the Work Station. A video documentary shows how teachers and students use the SLICE Program in a typical classroom and school.

The present invention preferably includes a designated "System Operator" who handles the conversion and exchange of information in the school's Work Station and plays a key role in the efficiency and effectiveness of the SLICE Program. The system operator undergoes a training course that lasts approximately 20 hours and is given before the program is initiated for the student participants.

The System Operator Training Course is designed to familiarize the system operator with all aspects of the computer and scanner hardware and software interaction. Practice using essential scanning and editing techniques make up a large part of the course. The system operator is also trained to use the SLICE system to catalogue information and archive the diskettes for easy access by teachers and students. Finally, the system operator is taught to identify problems with the school's Information Highway and shown how to instigate corrective measures.

Also essential to the success of the SLICE Program is a Technology Training Course that includes 30 hours of direct instruction and hands-on experience specific to using the equipment and software in the program and is designed to train parents alongside their youngsters. The course is usually scheduled over a period of six weeks in 1–2 hour blocks. The goal, of course, is to return students to their regular classes in the school as quickly as possible, and to make certain they have the skills and support they need to be successful there.

The curriculum addresses the interaction between word-processing and reading software, scanning and editing techniques, downloading material from the INTERNET, sending/receiving e-mail, and introduces the technological skills particularly relevant to students with language related learning disabilities so they can keep up in class, study for tests, and complete homework assignments. Parents are also given information regarding special education laws, rights, procedures and recent applications of assistive technology so they become more effective advocates. The following is an outline of the proposed curriculum:

| Technology Course Curriculum | |
| --- | --- |
| Lesson 1 | Orientation to the equipment and software |
| Lesson 2 | Understanding how computers respond to reading and writing difficulties |
| Lesson 3 | Introduction to scanners |
| Lesson 4 | Guided practice with pre-scanning, scanning |
| Lesson 5 | Editing, storing and organizing docments |
| Lesson 6 | Introduction to the auditory screenreader |
| Lesson 7 | Personaiizing the auditory screenreader |
| Lesson 8 | Using the auditory screenreader for work in class |
| Lesson 9 | Troubleshooting screenreader complications |
| Lesson 10 | Introduction to essential word-processing skills |
| Lesson 11 | Using the auditory screenreader for homework |
| Lesson 12 | Introduction to internet and e-maii |
| Lesson 13 | Accessing internet resources |
| Lesson 14 | Advocacy for special needs and assistive technology |
| Lesson 15 | Using this technology and program in the school |

This system has been successfully tested in a pilot program involving a seventh-grade dyslexic student, described in full in the paper attached hereto as Appendix A. Appendix A is hereby incorporated into and forms a constituent part of this application for all purposes. The student carried the equipment making up assembly 10, with the exception of scanner 14, in the same fashion other students carried textbooks and notebooks. The software also permitted the student to easily switch to a "notepad" for taking notes during class lectures, and preparing written assignments.

The use of this system enabled the student to complete more assignments and earn higher grades. The student's self-esteem was seen to improve, and his determination to complete his schoolwork in a "traditional" way has grown. Furthermore, the student has gained confidence in his abilities, learned to read a book without the use of assembly 10, and has started volunteering to read aloud in class.

APPENDIX A

New Town Middle School Research Pilot Project
95/96

Description of Program

Computer technology and software originally designed to assist individuals with visual disabilities was used to support the full inclusion of a seventh grade student w ho has limited reading and writing skills due to a dyslexic type of learning disability. The basic equipment (a laptop computer, a portable voice synthesizer, headphones and a scanner) were configured so that the student had full access to the printed information being used for instruction in his regular classes. All textbooks, worksheets, handouts and tests were scanned into electronic format and stored in the laptop computer's hard disk. The student's reading and writing assignments were not modified. Special education support was given in the resource room for less than 30 minutes a day.

The student typically carried the equipment (in the same way other students carried their textbooks and notebooks) from class to class and used it at his own desk whenever necessary. Selected material was "read" for the student by the synthesizer through his headphones. During this process, a cursor on the computer screen followed along with the written form of the document and reinforced the student's reading skills. The student could use search features to locate and cross reference to any topic being covered in class. The word processing software also allowed the student to switch easily to a "notepad" to take notes during lectures and editing features helped him complete quality written work.

Goal of the Pilot Project

To examine the effectiveness of this assistive technology and the feasibility of replicating the program for other children who have similar special education needs.

Objectives of this Study

Document the issues of implementing the technology in the classroom and in the school Measure the effectiveness of the assistive technology in terms of the student's academic performance and self concept Explore the nature of the home/school partnership that supported the program during the school year Sources of Data Qualitative information and empirical evidence was drawn from several sources throughout the 95/96 school year.

| | |
|---|---|
| School: | Interviews of teachers, administrator, teacher aide (Analysis) (FIG. 1) |
| | Diary Page (Sample with comments) (FIG. 2) |
| | Video |
| | Final Survey (Sample & Analysis) (FIG. 3) |
| Child: | Informal Interviews |
| | Schoolwork (Writing Samples) (FIG. 4) |
| | Report Cards |
| | Observation (home and school) |
| | Final Survey |
| | Reading Achievement Tests (Results) (FIG. 5) |
| Parent: | Informal Interviews |
| | Daily Diary |
| | Final Survey (Sample) (FIG. 6) |

Equipment and Software Used in the Study

| | |
|---|---|
| • Keynote Ultra 486 DXIV 100 | |
| Dual Scan Color Monitor | 8Mb RAM |
| 3.5 Floppy Drive | PCMCIA Slott |
| MS DOS version 6.22 | MS Windows 3.11 |
| • Artic PCMCIA Card | |
| • BV 3.09 WinVis 2 | |
| • Wordperfect 6.1 DOS | |

Characteristics of the Student Subject

Learning Characteristics

An identified learning disability, dyslexic in nature.

Severely depressed reading achievement following a history of interventions using a wide range of teaching methods and alternative curricula.

Consistently poor spelling, not noticeably improved by shortened tests and intensive study at home.

Written work not representative in detail or depth of measured verbal and conceptual capabilities.

Generally unable to cope with the pace of regular classroom work without modifications.

Personality Characteristics

Highly motivated to achieve.

Independent and willing to attempt new things.

Responsible with the property of self and others.

Family Characteristics

Supportive with an overwhelming interest in the child's learning.

Frequently interact with regular and special education teachers and school administrators.

Regularly attend IEP meetings and/or initiate them if necessary.

Results of the Study

Implementation

The primary difficulty with implementing this program has been in establishing an efficient procedure for transforming teacher documents into electronic text for the student's computer and printing out copies of the student's work for the teachers. Scanning classroom material, editing and restoring, it to diskette meant that teachers had to plan their lessons and tests well in advance and turn selected documents into the workstation in a timely fashion. Each teacher seemed to develop a different system for this responsibility which periodically lead to confusion and frustration amongst the staff. Furthermore, the student did not have a regular routine for going to the workstation to have his completed assignments printed out and this contributed to teachers' perceptions of being unable to adequately monitor his progress. A breakdown in transforming and transferring information can manifest in a variety of ways, but the root of the problem is fairly simple to resolve.

The individual roles and responsibilities for delivering the program were neither comprehensive nor definitively spelled out for this pilot project. The special education coordinator, appointed as the student's case manager, was not on site and had to delegate responsibility for monitoring his progress with regard to his Individual Education Plan to another teacher. At times school personnel had to rely on the student's familiarity and skill with the technology to support or instruct them or to solve glitches with the equipment. Other critical gaps had to be filled, ad hoc, as they emerged. For example, textbooks were being scanned and edited throughout the summer months, but the process was behind schedule and was becoming prohibitively expensive. The student's parents, older brother, aunt and grandparents eventually stepped in to help the consultant finish this job. These and other situations may have been detrimental to more global program outcomes, such as the parent/teacher partnership.

Fortunately, the student has not experienced any substantive difficulty using the technology in his classrooms. Early worries about running out of battery power, being teased by classmates, forgetting keystroke commands. etc. never materialized. In fact, the student is using the technology less and less, perhaps choosing to "wean" himself as much as possible.

Student Achievement and Self Esteem

Teachers have been surprised that the student has begun to volunteer to read in front of the class and impressed with his level of competence. The Woodcock-Johnson-R (Achievement) and Brigance Reading Comprehension tests show dramatic gains in the student's reading skills across the board. His current IEP specifically targets vocabulary and comprehension. The WJ-R Achievement test reveal a 1.1 year gain in the Reading Vocabulary Subtest and a 2.8 year gain in the Passage Comprehension Subtest over the last calender year. The student consistently scored at 80% accuracy through the eighth grade level on the Brigance Reading Comprehension test. Another IEP objective focuses on the student being able to write compound and complex sentences that incorporate descriptive words. Two samples of the student's written work (responses from February/1994 and November/1995 to the prompt "Write an advertisement to sell a house") were analyzed. Based on his use of more and longer words and sentences, the "readability" of his written work increased from a fifth to seventh grade level.

According to several teachers, the student is "fitting in" better and seems more comfortable than at the beginning of the year. These observations are compatible with the student's survey response that he is getting along better with other students and has more friends. In addition, the student feels that he has become a better student and is working harder. He has been earning higher grades and thinks that he is learning more. Although he has completed more homework this year, his parents say that he requires "a lot less"

help at home. Finally, he and his parents agree that teachers have higher expectations for him this year.

Home/School Partnership

In September, 1994, the parents began using parts of this technological system with their son at home. Encouraged by his success, they advocated for eight months before reaching agreement with the school that the program would be put into place there. The early days were filled with aggravations and anxiety. The parents were naturally concerned about the pressures that the program might place on their son who was moving to a new school. They were uncertain about how the middle school teachers and other students would react to having this technology in the classroom. They often had to become the "glue and string" that held the program together in the absence of decisive, advance planning by the school. During this period, their relationship with the school was characterized by confusion, conflict and periodic confrontations with teachers and administrators.

As the program has begun to function more smoothly, the parents' apprehensions have receded to some degree. Their contact with the school is starting to conform to a pattern more apical for middle school parents. For example, a teacher recently phoned to check out their son's suspicious excuse about a missing homework assignment. The conversation ended with laughter and a statement of mutual commitment to keep the lines of communication open. Their last parent/teacher conference included discussion about the effects of peer group pressure and ways to foster student responsibility.

Both parents report their son to be happier and under far less stress at school. The strain of trying to cope with academic demands had frequently spilled over at home in the past. They agree with their son that he is getting along better with them and his siblings this year.

Conclusions

The assistive technology program used in this project has allowed this student to cope successfully with all of his seventh grade subject areas in the regular classroom environment. Currently, no modifications are being made to his work assignments or grades and he requires virtually no direct instruction in the special education resource room. Most of the regular teachers have incorporated this technology with minimal disruption to their classroom routine. In fact, they were amazed at the student's test results since they considered their personal contribution to be so negligible and indirect. All of the teachers agree that the student would have suffered without the support the technology has offered him and would like the program to be expanded to include other students next year. Their genuine enthusiasm has been forged through a project which provided them with an invaluable exposure to technology and many positive experiences with inclusion.

Transforming and transferring written information between the teachers and student is fundamental for the success of the program. Although processing the information is not complicated, the procedure requires regular communication and good coordination between teachers, the student and the system operator in the workstation. To ensure that instructional information will be available to the student or the teachers, in the appropriate format at the appropriate time is simply a challenge to be overcome through careful planning at the earliest stage of program implementation. It should also be noted that in spite of ongoing problems with this procedure during the pilot project, the results were extremely impressive.

Initially, teachers had worried that the student would become overly dependent on the computer. Instead, they have discovered a student ever more determined to complete his schoolwork in the traditional way. Their present concern is how to ask or require a student of this age to use the technology when it seems necessary.

This program has demanded that the parents, more than any other participant, make massive shifts in their attitudes and activities. In dealing with the school, the parents have had to constantly transform themselves from advocates, to watchdogs, to supporters, to collaborators and never lose sight of their ultimate goal of securing their son's educational rights. In terms of their son, they have moved far beyond the days of being his tenuous lifeline to future educational and employment opportunities. As the pioneers of this innovative program, they have become a model of support for their son and an inspiration to other parents. Much of the satisfaction they feel today comes from the realization that they are finally getting to enjoy being a regular Mom and Dad to a regular seventh grade boy.

What is claimed is:

1. A system for educating learning disabled students, comprising:

a work station accessible by students and teachers for converting information between paper-written and computer character-recognized formats whereby a teacher or a student can convert paper-written information into a computer character-recognized format;

a plurality of student setups each for exchanging computer character-recognized information with said work station and for presenting computer character-recognized information to a student both audibly and visually in a synchronized manner to permit the student to acquire knowledge, understand assignments and produce work products in a computer character-recognized format that can be converted to a paper-written format at said work station for submission to the teacher;

a screen reader for audibly reproducing the information whereby the reading abilities of learning disabled individuals are assisted by hearing the information as they track it visually on the monitor; and a student support network for providing the student with supplemental information and guidance as needed to obtain a quality education.

2. The system of claim 1, wherein said work station comprises:

a desktop computer including a keyboard, CPU, floppy disk drive, monitor and word processing software;

an optical character recognition scanner and associated software; and a printer.

3. The system of claim 2, wherein said work station further comprises a telephone modem.

4. The system of claim 3, wherein said work station further comprises a CD-ROM drive.

5. The system of claim 1, wherein each of said student setups comprise:

a portable computer including a keyboard, CPU, floppy disk drive, monitor, audio output means, word processing software and auditory screen reading software.

6. The system of claim 5 wherein said student setup further comprises a set of headphones connectable to the audio output means of the computer.

7. The system of claim 5 wherein said student setup further comprises a CD-ROM drive, and a modem for accessing online computer resources.

8. The system of claim 1 wherein said student support network comprises:

online computer resources accessible through said work station via the computer and modem;

teachers and other school support individuals; and parents and other family support individuals.

9. The system of claim 8 wherein the online computer resources comprise:

the INTERNET; and the student online educational resources offered by APEL Education Consultancy Support Network.

10. A method for educating learning disabled individuals, comprising the steps of:

optically scanning paper-written information into the memory of a work station computer;

exporting the scanned information to a floppy disk using the work station computer;

placing the floppy disk in an individual student setup computer;

simultaneously visually reproducing and tracking the information from the floppy disk on the video monitor of the student setup computer while audibly reproducing the information using a screen reader, whereby the reading abilities of learning disabled individuals are assisted by hearing the information as they track it visually on the monitor.

11. The method of claim 10 wherein the paper-written information is an assignment prepared by a teacher that requires a written work product.

12. The method of claim 11, further comprising the steps of:

performing the required task defined in the assignment by using the student setup computer and speech synthesizer to prepare the work product in a computer character-recognized format;

exporting the computer-formatted work product to a floppy disk;

placing the floppy disk in the work station computer;

converting the computer-formatted work product from the floppy disk to a paper-written format using a printer connected to the work station computer; and submitting the paper-written work product to the teacher for evaluation.

* * * * *